United States Patent
Fassnacht et al.

(10) Patent No.: US 9,193,272 B2
(45) Date of Patent: Nov. 24, 2015

(54) JUMP-STARTING METHOD AND DEVICE FOR IMPLEMENTING THE METHOD

(75) Inventors: Jochen Fassnacht, Calw (DE); Roland Norden, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 812 days.

(21) Appl. No.: 13/392,456

(22) PCT Filed: Aug. 12, 2010

(86) PCT No.: PCT/EP2010/061773
§ 371 (c)(1),
(2), (4) Date: Jun. 5, 2012

(87) PCT Pub. No.: WO2011/026721
PCT Pub. Date: Mar. 10, 2011

(65) Prior Publication Data
US 2012/0286720 A1    Nov. 15, 2012

(30) Foreign Application Priority Data

Sep. 2, 2009  (DE) .................. 10 2009 029 091

(51) Int. Cl.
| | | |
|---|---|---|
| B60L 11/18 | (2006.01) |
| B60L 3/00 | (2006.01) |
| B60L 11/12 | (2006.01) |
| H02J 1/06 | (2006.01) |
| B60L 1/00 | (2006.01) |
| H02J 1/00 | (2006.01) |

(52) U.S. Cl.
CPC ............. *B60L 11/1811* (2013.01); *B60L 1/006* (2013.01); *B60L 3/0046* (2013.01); *B60L 11/126* (2013.01); *B60L 11/1816* (2013.01); *B60L 11/1838* (2013.01); *H02J 1/06* (2013.01); *B60L 2250/10* (2013.01); *H02J 2001/006* (2013.01); *Y02T 10/6217* (2013.01); *Y02T 10/7005* (2013.01); *Y02T 10/7077* (2013.01); *Y02T 90/121* (2013.01); *Y02T 90/127* (2013.01); *Y02T 90/128* (2013.01); *Y02T 90/14* (2013.01); *Y02T 90/163* (2013.01)

(58) Field of Classification Search
CPC .................................... H02J 7/14; B60K 6/26
USPC ......................................................... 320/105
See application file for complete search history.

(56) References Cited

U.S. PATENT DOCUMENTS

| | | | |
|---|---|---|---|
| 6,476,571 B1 * | 11/2002 | Sasaki ........................... 318/139 |
| 7,256,516 B2 * | 8/2007 | Buchanan et al. .............. 307/62 |
| 7,443,049 B1 | 10/2008 | Jones et al. | |
| 2004/0066168 A1 * | 4/2004 | George et al. ................. 320/105 |

FOREIGN PATENT DOCUMENTS

| | | |
|---|---|---|
| CN | 101415593 | 4/2009 |
| DE | 696 17 026 | 6/2002 |
| DE | 101 10 615 | 9/2002 |

(Continued)

OTHER PUBLICATIONS

International Search Report not available.

*Primary Examiner* — Thuan Do
(74) *Attorney, Agent, or Firm* — Kenyon & Kenyon LLP (57) ABSTRACT

In a jump-starting method between an electric vehicle providing a jump-start and an electric vehicle receiving a jump-start, the electrical systems of the two electric vehicles are temporarily interconnected electrically during the time of the jump-starting.

12 Claims, 6 Drawing Sheets

(56) References Cited

FOREIGN PATENT DOCUMENTS

| | | |
|---|---|---|
| DE | 101 19 985 | 10/2002 |
| DE | 10 2007 043 603 | 3/2009 |
| EP | 0177180 | 4/1986 |
| JP | 4-334907 | 11/1992 |
| JP | 2004-134278 | 4/2004 |

* cited by examiner

JUMP-STARTING METHOD AND DEVICE FOR IMPLEMENTING THE METHOD

BACKGROUND OF THE INVENTION

1. Field of the Invention

The present invention relates to a jump-starting method and a device for implementing the method and a device for implementing the method.

2. Description of Related Art

A conventional motor vehicle normally includes a combustion engine for the motive power and at least one battery for storing electrical energy. In the case of a breakdown, for example, in the case of a discharged or only weakly charged battery, the broken-down vehicle may be rendered operational again in a relatively simple manner, by a jump-start from another motor vehicle. To that end, the electrical systems of the two vehicles are interconnected by a two-pole jumper cable. In this connection, it must only be made sure that the electrical system voltage of the two vehicles is the same and the vehicle providing the jump-start can supply the necessary power of approximately 1-5 kW to start the combustion engine of the broken-down vehicle. When the engine is running, the discharged battery may then be recharged by the generator. In the case of older vehicles and vehicles not having an automatic transmission, it is even possible to tow-start or push-start them. However, this is different for electric vehicles (hereinafter referred to as EV). These vehicles are designed in such a manner, that normally, they can only be recharged on the power supply system.

From published German patent application document DE 101 10 615 A1, a method for producing control pulses for power semiconductors is known, in particular, for the purpose of generating offset control pulses for half-bridges, which are accommodated on multiphase converters or d.c-d.c. converters. In this method, the reference voltage is shifted by a delay time corresponding to the offsets, or a PWM signal is shifted by a delay time corresponding to the period divided by the number of offsets.

Published German patent application document DE 101 19 985 A1 describes a device for supplying power to a multi-voltage electrical system of a motor vehicle. This device has a multi-voltage electrical system situated in a motor vehicle, which provides at least one first and one second voltage level, in each case, differing from the reference potential. The multi-voltage electrical system is powered from at least one electrical energy store. In addition, it has at least one converter for connecting the two voltage levels. Furthermore, supply means are provided for externally supplying power to the multi-voltage electrical system. The mentioned converter may be implemented in the form of a multiphase converter. In such converters, several converter cells of lower capacity are connected in parallel, and the power circuits are clocked in a time-staggered manner. This saves filter components on account of the effects of destructive interference. Such multiphase converters make it possible to implement the first and second converters, using the available phases of a single multiphase converter. To this end, the phases are split up in a converter having step-down and step-up converter functionality. Inside the converter, the phases are then separated on the input side, via a switch.

From German patent application DE 10 2007 043 603.5, a multiphase d.c.-d.c. converter is known which has a plurality of converter cells that are disposed in parallel to one another and are clocked in a time-staggered manner. In each instance, a magnetic measuring bridge is disposed between the outputs of two converter cells.

Published German patent application document DE 696 17 026 describes a system for charging a battery of accumulator storage batteries of a motor vehicle from a single-phase voltage source, the motor vehicle being equipped with a three-phase a.c. driving motor having three windings, as well as with an inverter having three interrupters for powering the three-phase a.c. motor, means being provided for operating the above-mentioned inverter as an a.c./d.c. voltage converter having a rectifier voltage-increasing stage, which has a first and a second interrupter branch of the inverter, a voltage-decreasing stage having a third interrupter branch of the inverter, and means for connecting the first and second interrupter branches to the single-phase voltage source, and for connecting the center tap of the third interruption branch to the battery for supplying d.c. voltage. In the system, the center taps of the first and second interrupter branches are connected to the above-mentioned single-phase voltage source via a first inductor, which is made up of at least one winding of the three-phase a.c. motor. Furthermore, the center tap of the third interrupter branch is connected to the battery via a second inductor, which is made up of at least one winding of said three-phase current motor, which differs from the winding(s) that form(s) the first inductor.

An electric vehicle or a so-called plug-in hybrid vehicle, i.e., a hybrid vehicle, whose batteries may be charged on the power supply system, normally has at least one three-phase inverter for controlling a three-phase electric motor for the traction of the electric vehicle. Such an inverter may also be used, in cooperation with line inductors, for withdrawing energy from the power supply system, or to feed energy into the power supply system. This is also known from elevator drives or crane drives, for example. In this connection, the intermediate circuit is first charged slowly, via a precharge contactor having resistors, to a voltage just above the rectified system voltage, and then the inverter is used as a step-up converter, which rectifies the three-phase network current or inverts the direct current in the intermediate circuit into a three-phase current system. In the known applications, the system currents are set by the inverter on the basis of the voltage deviation in the intermediate circuit from a setpoint value, and possibly on the basis of a load current, as well. However, for use as a battery charging device, a different type of control of the inverter must be implemented, since in this case, the battery charging current is the desired quantity to be set, and not the desired intermediate circuit voltage.

BRIEF SUMMARY OF THE INVENTION

The present invention is based on the object of providing a solution for jump-starting an electric vehicle, when no power supply system is available at the breakdown location for charging the electric vehicle.

The design approach of the present invention provides the advantage that the vehicle that is no longer travel-ready due to a lack of energy may be charged again, within a sufficiently short time frame of approximately 10 to 15 minutes, to the point that the vehicle can reach, on its own power, a charging station connected to the power supply system. In Central Europe, the vehicle must travel approximately 10 to 20 km for that purpose. In this context, the design approach of the present invention advantageously ensures that the vehicle providing the breakdown assistance is not discharged to the point that it, itself, is rendered non-operational after providing a jump-start. Thus, the vehicle providing breakdown assistance must still retain an energy reserve, which likewise allows a travel range of at least 10 to 20 km. In addition, even in the case of high voltage, the present invention provides reliable energy transmission between the vehicles involved. For, using a customary power supply system voltage of approximately 12 V to 42 V, the amount of energy necessary for practical breakdown assistance cannot be transferred in the above-mentioned, short time frame. In order to permit universal application, the present invention provides standardized interfaces. In this manner, breakdown assistance between any electric vehicles is possible.

DETAILED DESCRIPTION OF THE INVENTION

Figure 1:
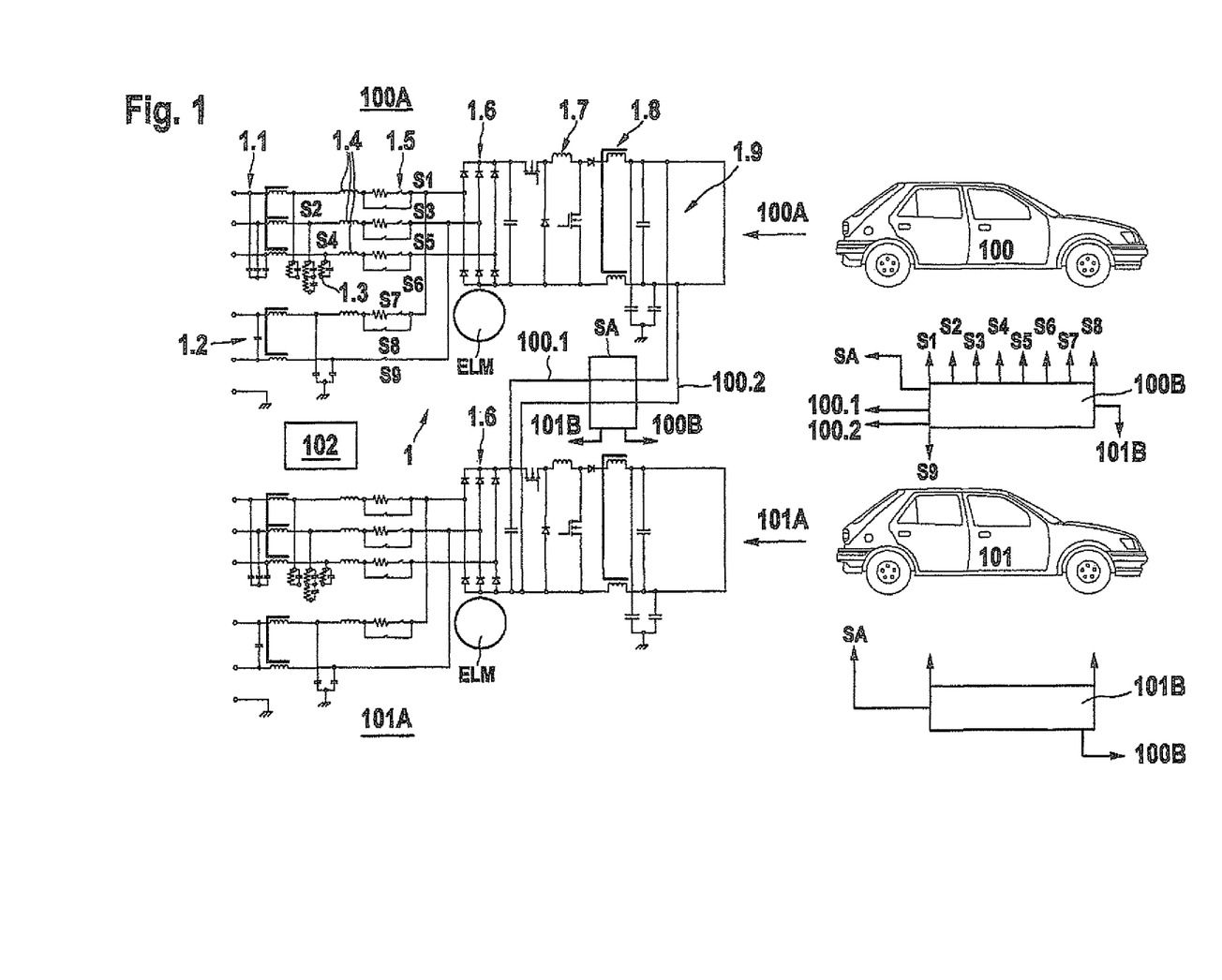
FIG. 1 shows a first exemplary embodiment of a vehicle giving a jump-start and a vehicle receiving a jump-start, along with essential components of their electrical systems.

FIG. 1 shows a vehicle 100 giving a jump-start, along with essential components of its electrical system 100A, and a vehicle 101 receiving a jump-start, along with essential components of its electrical system 101A. Vehicles 100, 101 are electric vehicles, which are each propelled by an electric motor ELM that is, however, only schematically represented in FIG. 1. Electrical systems 100A, 101A of vehicles 100, 101 are essentially identical. Therefore, in the following, only the components of electrical system 100A of vehicle 100 are described, to the extent that they are shown in FIG. 1.

Electrical system 100A includes a power supply connection 1.1 for connecting to a three-phase power supply system and, in addition, a power supply connection 1.2 for connecting to a two-phase power supply system. This allows a high flexibility for charging the energy store(s) of vehicle 100 on different power supply systems. Immediately following power supply connection 1.1 are a line filter 1.3, a line inductor 1.4, as well as a precharge contactor/master contactor 1.5. These are followed by a rectifier 1.6 and a step-up/step-down converter 1.7. A connection to a d.c. link busbar 1.9 of vehicle electrical system 100A is wired via an EMC filter 1.8.

Electrical system 100A further includes a control unit 100B, by which switch elements S1, S2, S3, S4, S5, S6, S7, S8, S9 are controllable. In a simple, specific embodiment of a jump-starting device, one could now think that, similar to the case of conventional vehicle electrical systems, the batteries on both sides or the d.c. voltage links on both sides of the vehicle providing the jump-start and the vehicle receiving the jump start can be interconnected by a suitable cable. Unfortunately, in this instance, there is a risk that impermissibly high currents flow and/or the jump-start will fail, since the battery of the vehicle waiting for a jump-start has a higher voltage than the battery of the vehicle providing the jump-start. In order to prevent this problem, a d.c. motor controller must be provided for voltage adjustment and power control.

In this context, different embodiment variants are conceivable, depending on the layout of the vehicle electrical systems in question.

If electrical systems 100A, 101A of vehicles 100, 101 include a rectifier and a post-connected converter (d.c.-d.c. converter), as shown in FIG. 1, then the solution represented in FIG. 1 is suitable. In this context, d.c. link 1.9 of the vehicle 100 providing a jump-start is connected, via lines 100.1, 100.2, to the d.c. link busbar of the vehicle 101 awaiting the jump-start. Lines 100.1, 100.2 are expediently combined to form a jumper cable, which is provided with suitable plug-and-socket connectors that, in conjunction with plug-and-socket connectors attached to a vehicle, allow an electrical connection between the two vehicles 100, 101 that is protected against polarity reversal. Therefore, in general, a plug-and-socket connection is to be provided in each vehicle, via which, in each instance, the d.c. link busbar (battery terminals) and the d.c. link busbar (after the rectifier unit and in front of the converter) of each vehicle 100, 101 are connectible in a manner safe from contact. Using the specific connection of the jumper cable having the at least two lines 100.1, 100.2, it is then determined, in each instance, which of the two vehicles 100, 101 is selected to be the vehicle awaiting a jump-start or providing a jump-start. Particularly advantageously, a connection between conductors 100.1 and 100.2 and control unit 100B may also be provided. Control unit 100B monitors lines 100.1, 100.2 and signals a possibly occurring case of polarity reversal.

In the case of polarity reversal, a device, which not only outputs a warning signal, but also, as a precaution, breaks the connection between the two electrical systems 100A, 101A with the aid of suitable switch elements, is particularly reliable. These switch elements are advantageously controlled by control unit 100B. The power control of the energy transfer takes place via the d.c.-d.c. converter of the vehicle 101 receiving a jump-start. The battery management systems of the two participating vehicle electrical systems 100A, 101A have to assume the coordination of the charging control. The software possibly required for the control may be advantageously implemented in control units 100B, 101B.

In the vehicle 100 providing a jump-start, it must be particularly observed that the battery is not discharged too much and the discharging power is not impermissibly high. In the vehicle 101 receiving a jump-start, is must be particularly watched that the battery charging power is not too high. To this end, communication between the two participating vehicles, which is functionally carried out by control units 100B, 101B, is required. For that purpose, an interface SA in the wiring of lines 100.1, 100.2, which is connectible to control units 100B, 101B, may also be provided in an advantageous manner. The charging power to be set by the d.c.-d.c. converter is advantageously oriented towards a selection of a minimum value of the possible capacities of the two batteries of the participating vehicles. In this context, it must also be determined, which of the two vehicles assumes the control of the power-controlling d.c.-d.c. converter. In this instance, the control is preferably assumed by the vehicle receiving the jump-start, since its d.c.-d.c. converter is also used for the jump-starting operation.

Figure 2:
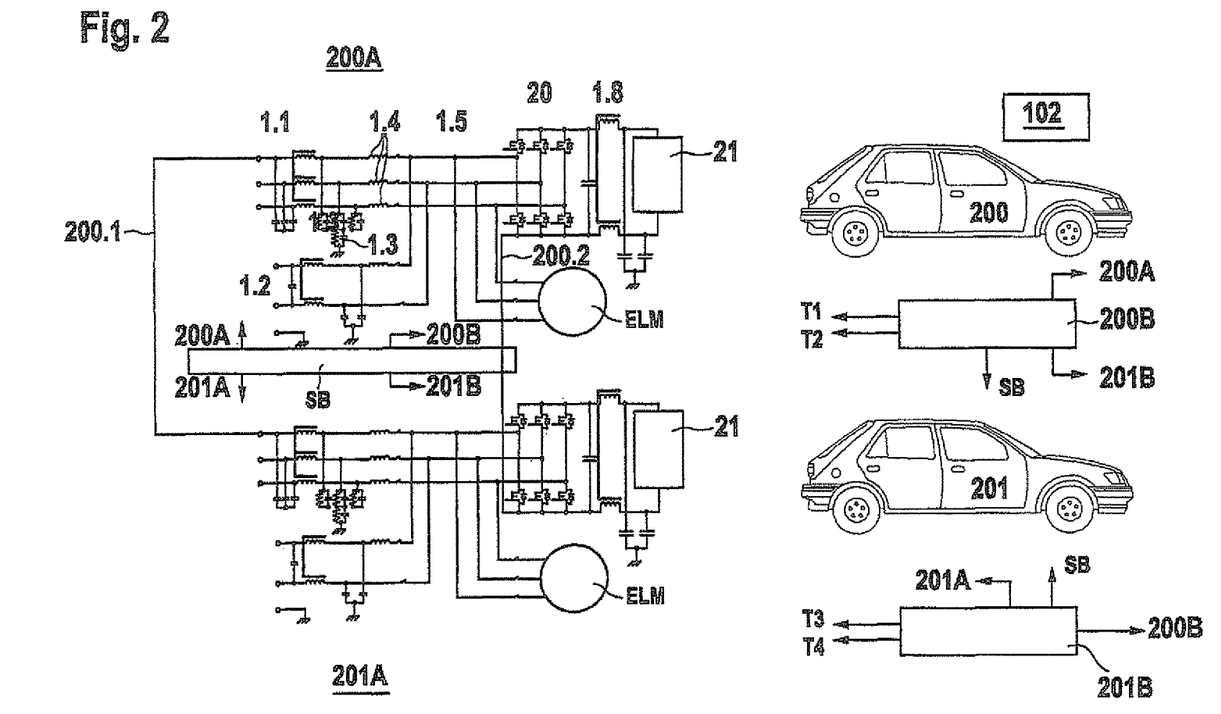
FIG. 2 shows a further exemplary embodiment of a vehicle giving a jump-start and a vehicle receiving a jump-start, along with essential components of their electrical systems.

Referring to FIG. 2, an embodiment variant of the present invention is described which allows jump-starting in vehicles that are equipped with an inverter (active front end with respect to the power supply system). Such an inverter or a portion of the same may be advantageously used as a power controller for the jump-starting operation. The vehicle providing a jump-start is denoted by reference numeral 200, and the vehicle receiving a jump-start is denoted by reference numeral 201. Electrical systems 200A, 201A of vehicles 200, 201 are constructed essentially identically. Thus, in the following, only components of electrical system 200A are described in more detail.

Electrical system 200A of the vehicle 200 providing a jump-start includes, on the input side, a power supply connection 1.1 for connection to a three-phase system, and a power supply connection 1.2 for optional connection to a two-phase a.c. system. This provides increased flexibility for charging the battery of the vehicle. Filtering devices, such as a line filter and a line inductor, are initially followed by a master contactor 1.5, which is followed by an inverter 20. Inverter 20 is followed by an EMC filter 1.8, which is followed by the HV electrical system (HV=high voltage). The at least one electric motor of vehicle 200 is denoted by ELM. In order to render a jump-start possible, electrical systems 200A, 201A of the vehicle 200 providing a jump-start and the vehicle 201 receiving a jump-start are interconnected by lines 200.1 and 200.2. In this context, line 200.1 connects the two power supply connections 1.1 of electrical systems 200A and 201A. In this case, in FIG. 2, a connection between phase lines L1 is shown only by way of example. Second line 200.2 connects the negative terminals of the d.c. link busbars of the two electrical systems 200A, 201A.

For the case in which the current electrical system voltage of the vehicle 201 waiting for a jump-start is higher than the electrical system voltage of the vehicle 200A providing a jump-start, a step-up converter mode is necessary in order to allow a transfer of energy by vehicle 200 to vehicle 201. To that end, switch elements T2 and T3 must be blocked, while switch element T1 is switched to be continuously conductive and switch element T4 is clocked. Switch elements T1, T2, T3, T4 are, advantageously, power transistors in IGBT technology. In the circuit layout described, the step-up converter is made up of switch element T4, inductors of line filters 1.3, 1.4 connected on the incoming side, and the antiparallel diode of switch element T3.

If the electrical system voltage of the vehicle 200A receiving a jump-start is less than the electrical system voltage of the vehicle 200 providing a jump-start, then the use of a step-down converter is advisable in order to bring the voltage levels into conformity. Such a step-down converter may be advantageously made up of switch element T1, the antiparallel diode of switch element T2 and the line inductors 1.4 connected on the incoming side. In this context, switch elements T2, T3, T4 are blocked, while switch element T1 is appropriately clocked. In this case, the maximum possible transmission power corresponds to the minimum value of the maximum allowable discharging power and the maximum allowable charging power. These power requirements must be controlled by the battery management systems of the two vehicles 200, 201. To that end, the electrical systems 200A, 201A on both sides include control units 200B, 201B, which, on one hand, control switch elements in the electrical system assigned to them and, on the other hand, communicate with each other during the time of the jump-starting operation. Thus, for example, control unit 200B controls switch elements T1, T2 of electrical system 200A, and control unit 201B controls switch elements T3, T4 of electrical system 201A. The communication between control units 200B, 201B is indicated by correspondingly named arrows 200B, 201B.

The communication between the above-mentioned control units is conducted via interface SB, to which control units 200B, 201B are connected. Of course, in the embodiment variants of the present invention described here, care must also be taken that the energy store of the vehicle 200 providing a jump-start is not overly discharged, in order to prevent this vehicle from breaking down, itself. The energy store of the vehicle 200 providing a jump-start may only be discharged to the point that the minimum range still amounts to at least approximately 10 to 20 km. It is expected that within this range, a suitable charging station may be encountered in order to recharge the energy store.

Figure 3:
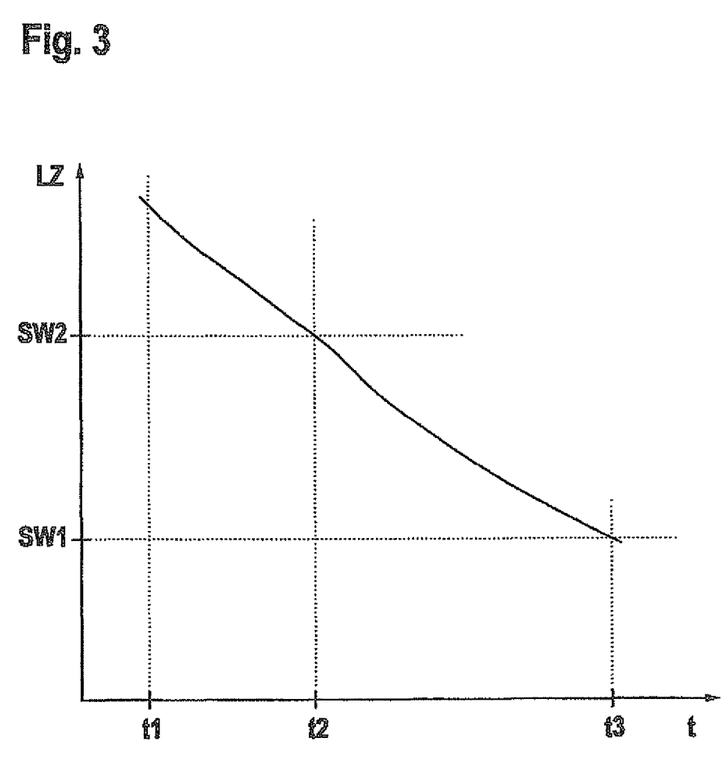
FIG. 3 shows a graph showing the state of charge of a vehicle providing a jump-start as a function of time.

In this context, a threshold value S1 for the state of charge of the vehicle providing a jump-start is specified, as explained below with reference to FIG. 3. State of charge LZ of the vehicle providing a jump-start is represented as a function of time t. It is assumed that the electrical systems of the two vehicles are connected, and that the jump-start begins at time t1. The supply of energy to the vehicle 201 receiving a jump-start causes the state of charge of the vehicle 200 providing a jump-start to decline. Predefined threshold value SW1 is reached at time t3. The jump-starting operation is terminated, since otherwise, the vehicle providing a jump-start runs the risk of breaking down.

According to an embodiment variant of the present invention, instead of a fixed threshold value SW1, a variable threshold value SW1\* may be stipulated, whose value, for example, is a function of the specific distance of the breakdown location to the nearest charging station. The closer the breakdown location is to the charging station, the smaller the state of charge of the vehicle providing the jump-start may be selected to be, and therefore, the smaller the threshold value SW1\* may be selected to be. This allows assistance to be provided that is as effective as possible. The specific distance of the breakdown location from the nearest charging station may be ascertained, for example, from the digital map of a navigation system.

In order to increase the range of an electric vehicle, it has already been proposed that it be equipped with a so-called range extender. This is understood to be a small combustion engine, which is merely used to charge the energy store of the electric vehicle via a generator. The range extender is activated when the state of charge of the electric vehicle falls below a particular minimum value. For the case in which a vehicle providing a jump-start is equipped with such a range extender 102 (see FIG. 2), then, as shown in FIG. 3, a second threshold value SW2 of the state of charge may be advantageously selected, which lies above above-mentioned threshold value SW1. Upon reaching threshold value SW2 during a jump-starting operation, which, in FIG. 3, is the case at time t2, then range extender 102 is started, in order to be able to continue the jump-starting operation until, at the most, threshold value SW1 is reached.

In each instance, the power control is preferably assumed by the vehicle in whose inverter a switch element is operated in a clocked manner during the jump-starting operation. Accordingly, in a step-down converter mode, the vehicle 200 providing a jump-start assumes the control. In a step-up converter mode, the vehicle 201 receiving a jump-start assumes the control. Two-step control, pulse width modulation, or the like may be advantageously used for controlling the respective switch element operated in a clocked manner. In this embodiment variant, lines 200.1, 200.2 are also to take the form of a cable protected against polarity reversal, which has appropriate plug-and-socket connections. Of course, appropriate electric plug-and-socket connections are also to be provided in vehicles 200, 201. The cable containing lines 200.1, 200.2 also includes, particularly advantageously, an interface SB again, which allows a connection to the electrical systems 200A, 201A on both sides and, in particular, to control units 200B, 201B.

Figure 4:
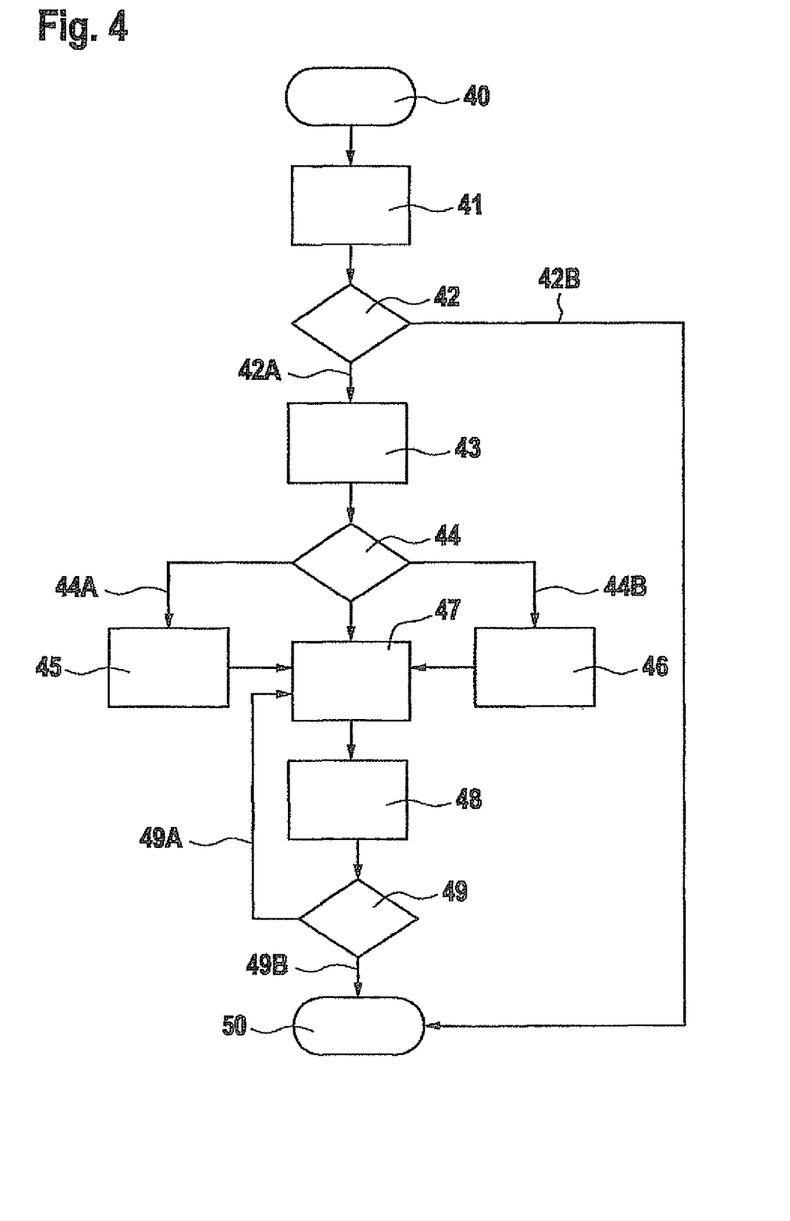
FIG. 4 shows a flow chart for explaining a jump-starting operation.

In the following, with reference to the flowchart shown in FIG. 4, a jump-starting operation between two electric vehicles, e.g., between electric vehicles 100 and 101 in FIG. 1, is explained by way of example. At starting time 40 of the jump-starting method, there is an electrical connection between the two electrical systems 100A and 101A of the vehicle 100 providing a jump-start and the vehicle 101 requiring a jump-start. Therefore, the above-mentioned vehicles were connected in a manner protecting against polarity reversal, using the jumper cable that includes lines 100.1, 100.2 and interface SA. Control units 100B and 101B are also connected to interface SA; in this manner, the control units being able to communicate with each other in order to control the jump-starting operation. In step 41, the state of charge of the two vehicles 100, 101 is checked. In the following branching step (step 42), the method branches out to the following alternatives as a function of the state of charge of the vehicle 100 providing a jump-start.

If the state of charge of the vehicle 100 providing a jump-start is too low for an effective jump-start, then the jump-starting method is terminated immediately, in order not to put the operability of vehicle 100 at risk. Thus, via step 42B, end point 50 is reached at which the jump-starting method is brought to an end. If the state of charge of vehicle 100 is sufficiently large, then, via step 42A, the method transitions to step 43 in which the voltage levels of the two electrical systems 100A and 101A are checked. In branching step 44, the method transitions either to step 45 via step 44A, or to step 46 via step 44B, as a function of the result of the voltage check. For example, the path through step 44A is taken, when the voltage level of electrical system 101A of vehicle 101 is greater than the voltage level of electrical system 100A of the vehicle 100 providing a jump-start. In this case, in step 45, electrical system 100A of vehicle 100 is switched to step-up converter mode, in order to bring the voltage levels of the two electrical systems into conformity in this manner. For example, the path through step 44B is taken, when the voltage level of electrical system 101A of vehicle 101 is less than the voltage level of electrical system 100A of the vehicle 100 providing a jump-start. In this case, in step 46, electrical system 100A of vehicle 100 is switched to step-down converter mode, in order to bring the voltage levels of the two electrical systems into conformity in this manner.

In step 47, the charging operation at the vehicle 101 receiving a jump-start is carried out. In step 48, the state of charge of the vehicle 100 providing a jump-start is checked, preferably periodically, in regular intervals. In step 49, the method branches out to either step 49A or step 49B as a function of the result of the check. Via step 49A, the method returns to step 47, and the charging operation for the vehicle 101 receiving a jump-start continues. Via step 49B, the method transitions to end point 50 of the jump-starting operation, when it is established that the state of charge of the vehicle providing a jump-start has become too low. This may be determined, for example, when the state of charge falls below a fixed threshold value for the state of charge; see, for example, threshold value S1 in FIG. 3.

Figure 5:
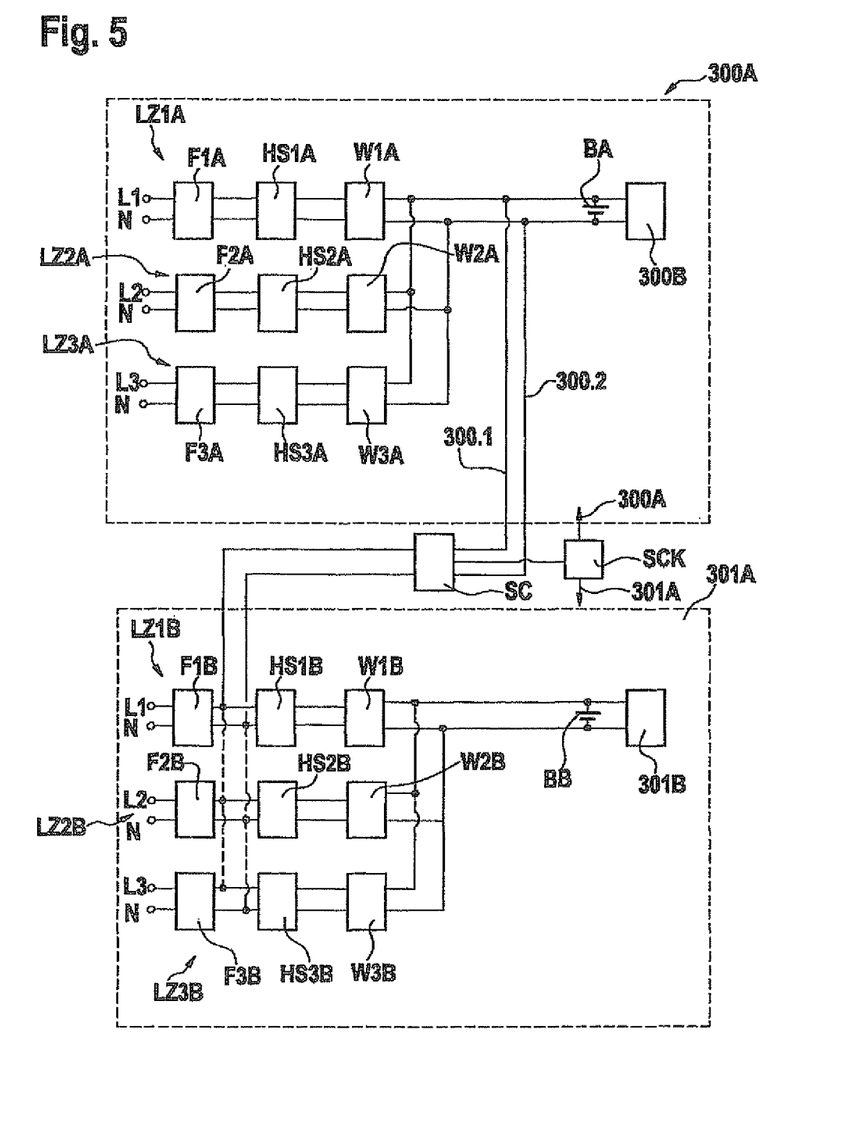
FIG. 5 shows a further exemplary embodiment of a vehicle giving a jump-start and a vehicle receiving a jump-start, along with essential components of their electrical systems.

FIG. 5 shows, in a simplified representation in the form of a block diagram, a further exemplary embodiment of electrical systems 300A, 301A of a vehicle giving a jump-start and a vehicle receiving a jump-start. The vehicles themselves are not shown with them. The electrical system of the vehicle providing a jump-start is denoted by 300A, the electrical system of the vehicle taking advantage of a jump-start is denoted by 301A. Electrical system 300A includes three parallelly connected charging branches LZ1A, LZ2A, LZ3A. Each charging branch includes a filter, a step-up converter, and an electrically isolating converter, in particular, a step-down converter. Accordingly, charging branch LZ1A includes filter F1A, step-up converter HS1A and converter W1A. Charging branch LZ2A includes filter F2A, step-up converter HS2A and converter W2A. Charging branch LZ3A includes filter F3A, step-up converter HS3A and converter W3A. Battery BA of electrical system 300A is charged, using the voltage provided by charging branches LZ1A, LZ2A, LZ3A. Further components of electrical system 300A not represented here in detail are summarily denoted by 300B.

Electrical system 301A likewise includes three charging branches LZ1B, LZ2B, LZ3B for powering battery BB. Each charging branch is constructed in a manner equivalent to the charging branches of electrical system 300A. Thus, charging branch LZ1B includes a filter F1B, a step-up converter HS1B and a converter W1B. Charging branch LZ2B includes a filter F2B, a step-up converter HS2B and a converter W2B. Charging branch LZ3B includes a filter F3B, a step-up converter HS3B and a converter W3B. Again, the block denoted by reference numeral 301B summarily stands for further components of electrical system 301A.

For the purpose of jump-starting, the two electrical systems 300A, 301A may be interconnected via lines 300.1 and 300.2. In this context, the above-mentioned lines connect battery BA of electrical system 300A to at least one charging branch, in particular, charging branch LZ1B, of electrical system 301A. Alternatively, battery BA may also be connected to all charging branches LZ1B, LZ2B, LZ3B of electrical system 301A, which is indicated by the dashed line routing in FIG. 5. Instead of three parallelly connected charging branches LZ1A, LZ2A, LZ3A, the vehicle electrical system may also only have a single charging branch, e.g., charging branch LZ1A. Lines 300.1, 300.2 form a charging cable, which includes an interface SC having a functionality already described above in connection with interface SA. In addition, a communications module SCK may be provided in connection with interface SC or, alternatively, also as an integral component of interface SC. The two electrical systems are able to communicate with one another in a wired or wireless manner no later than when the two electrical systems 300A, 301A are connected by a charging cable (lines 300.1, 300.2). In this manner, it may be checked and ensured that the two electrical systems are compatible and a jump-start is possible without risk.

Figure 6:
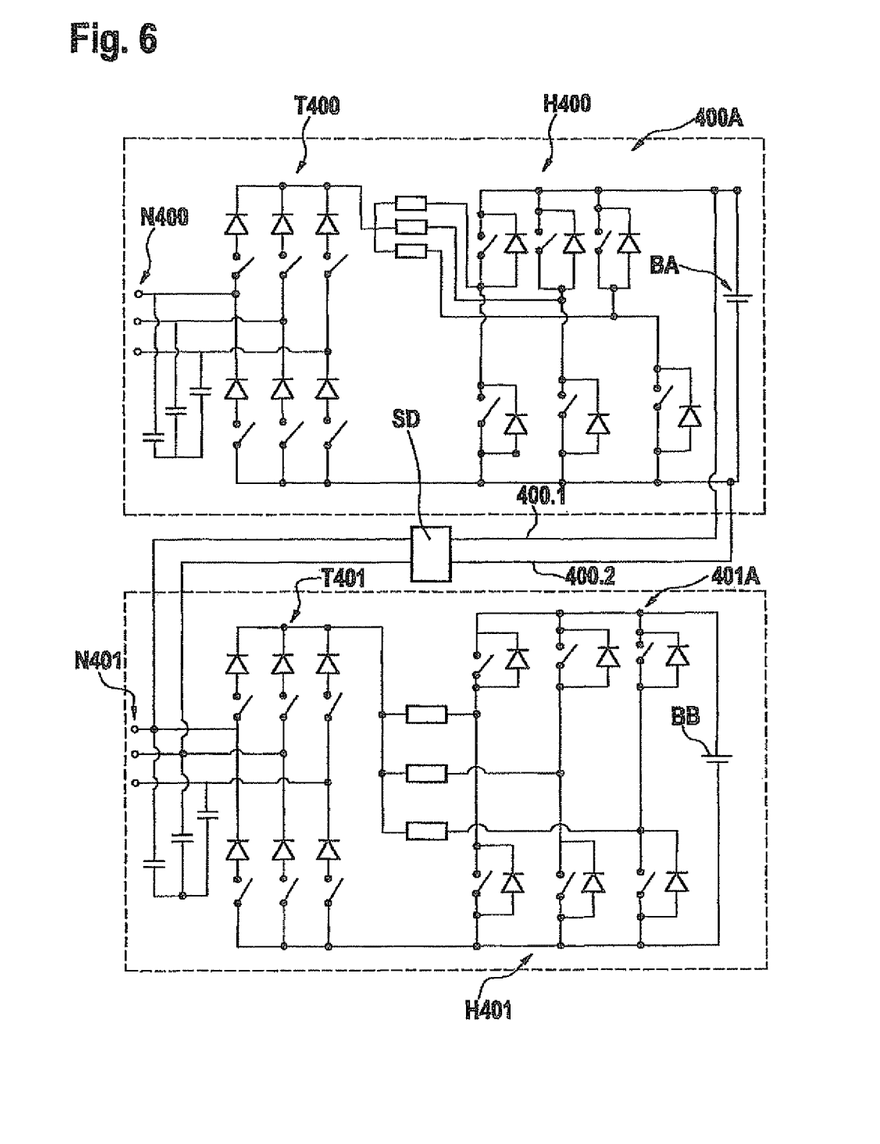
FIG. 6 shows a further exemplary embodiment of a vehicle giving a jump-start and a vehicle receiving a jump-start, along with essential components of their electrical systems.

FIG. 6 shows a further embodiment variant having electrical system 400A of a vehicle giving a jump-start and electrical system 401A of a vehicle receiving a jump-start. Electrical system 400A includes a battery BA, which is chargeable via a power supply connection N400, a step-down converter T400 and a step-up converter H400. Electrical system 401A includes a battery BB, which is chargeable via a power supply connection N401, a step-down converter T401 and a step-up converter H401. For the case of the jump-start, the terminals of battery BA of electrical system 400A are connected by lines 400.1 and 400.2 to 2 phase connections of power supply connection N401. The lines 400.1 and 400.2 preferably configured as a jumper cable further include an interface SD having the functionality already described above.

What is claimed is:

1. A method for jump-starting a first electric vehicle by a second electric vehicle providing the jump-start, when no power supply system is available to start the first electric vehicle, wherein each of the first and second electric vehicles is provided with a step-up/step-down converter as a charging device, the method comprising:

temporarily interconnecting electrical systems of the first electric vehicle receiving the jump-start and the second electric vehicle providing the jump-start during a time of the jump-start, wherein a d.c. link busbar of the second electric vehicle providing the jump-start is connected to a d.c. link busbar of the first electric vehicle receiving the jump-start.

2. The jump-starting method as recited in claim 1, wherein:
charge states of the first and second electric vehicles are determined at the beginning of the jump-starting method;
a first threshold value is specified for the charge state of the second electric vehicle providing the jump-start; and
the jump-starting method is aborted when the charge state of the second electric vehicle providing the jump-start falls below the first threshold value.

3. The jump-starting method as recited in claim 2, wherein:
the second electric vehicle providing the jump-start is equipped with a range extender;
a second threshold value for the charge state of the second electric vehicle providing the jump-start charge is specified, the second threshold value being greater than the first threshold value; and
the range extender of the second electric vehicle providing the jump-start is started no later than when the charge state of the second electric vehicle falls below the second threshold value.

4. The jump-starting method as recited in claim 2, wherein the first threshold value is variable.

5. The jump-starting method as recited in claim 2, wherein the magnitude of the first threshold value is selected to correspond to a predetermined minimum driving range of the second electric vehicle.

6. The jump-starting method as recited in claim 1, wherein:
voltage values of the electrical systems of the two vehicles are measured at the beginning of the jump-starting method; and
the electrical system of the second electric vehicle providing the jump-start is operated in a step-up converter mode when the voltage value of the first electric vehicle receiving the jump-start is greater than the voltage value of the second electric vehicle providing the jump-start.

7. The jump-starting method as recited in claim 1, wherein:
voltage values of the electrical systems of the two vehicles are measured at the beginning of the jump-starting method; and
the electrical system of the second electric vehicle providing the jump-start is operated in a step-down converter mode when the voltage value of the first electric vehicle receiving the jump-start is less than the voltage value of the second electric vehicle providing the jump-start.

8. A method for jump-starting a first electric vehicle by a second electric vehicle providing the jump-start, when no power supply system is available to start the first electric vehicle, wherein each of the first and second electric vehicles is provided with an inverter as a charging device, the method comprising:
temporarily interconnecting electrical systems of the first electric vehicle receiving the jump-start and the second electric vehicle providing the jump-start during a time of the jump-start, wherein a d.c. link busbar of the second electric vehicle providing the jump-start is connected to a d.c. link busbar of the first electric vehicle receiving the jump-start, and wherein power supply connections of the electrical systems of the first and second electric vehicles are interconnected.

9. A system for providing a jump-start between a first electric vehicle receiving the jump-start and a second electric vehicle providing the jump-start, when no power supply system is available to start the first electric vehicle, comprising:
plug-and-socket connections provided in the two electric vehicles, wherein the plug-and-socket connections are protected against polarity reversal; and
a charging cable for connecting the two electric vehicles for the duration of the jump-start operation, wherein the charging cable is protected against polarity reversal.

10. The device as recited in claim 9, wherein the charging cable includes an interface via which the execution of the jump-start is controlled.

11. The device as recited in claim 10, wherein electrical systems of the two electric vehicles connected for the purpose of jump-starting each have at least one control unit for the control of the jump-start operation.

12. The device as recited in claim 11, wherein the control units are interconnected via the interface of the charging cable and communicate with one another through the interface for the control of the jump-start operation.

* * * * *